United States Patent
Kumar et al.

(10) Patent No.: US 11,593,161 B2
(45) Date of Patent: Feb. 28, 2023

(54) METHOD TO CREATE AND PERFORM APPROPRIATE WORKFLOW FOR DATACENTER MIGRATION

(71) Applicant: EMC IP Holding Company LLC, Hopkinton, MA (US)

(72) Inventors: Suren Kumar, Vellore (IN); Senthil Kumar Urkavalan, Bangalore (IN); Vinod Durairaj, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 266 days.

(21) Appl. No.: 17/073,096

(22) Filed: Oct. 16, 2020

(65) Prior Publication Data
US 2022/0121482 A1   Apr. 21, 2022

(51) Int. Cl.
*G06F 9/46*   (2006.01)
*G06F 9/48*   (2006.01)

(52) U.S. Cl.
CPC .......... *G06F 9/4881* (2013.01); *G06F 9/485* (2013.01)

(58) Field of Classification Search
CPC ............................. G06F 9/4881; G06F 9/485
See application file for complete search history.

(56) References Cited

U.S. PATENT DOCUMENTS

| | | | |
|---|---|---|---|
| 8,832,699 B2 * | 9/2014 | Neft | G06F 9/5077 718/102 |
| 2006/0026195 A1 | 2/2006 | Gu et al. | |
| 2013/0031256 A1 * | 1/2013 | Hampel | H04L 69/14 709/227 |
| 2013/0212200 A1 | 8/2013 | Dennis et al. | |
| 2020/0026538 A1 | 1/2020 | Cui et al. | |

OTHER PUBLICATIONS

A Behavioral Study of Task Scheduling Algorithms in Cloud Computing.*

* cited by examiner

*Primary Examiner* — Camquy Truong
(74) *Attorney, Agent, or Firm* — Chamberlain, Hrdlicka, White, Williams & Aughtry (57) ABSTRACT

Embodiments described herein relate to a method for new endpoint addition. The method may include receiving, during execution of a migration workflow, a request to add a new endpoint to the migration workflow. The execution of the migration workflow includes performing a first migration job associated with a first consistency group and assigned a first priority; making a first determination that the first priority is higher than a priority threshold; based on the first determination, completing the first migration job; performing, after completing the first migration job, a new endpoint addition action set. The method may also include adding, based on the new endpoint migration job priority, the new endpoint migration job to a queue of remaining migration jobs of the migration workflow.

17 Claims, 7 Drawing Sheets

METHOD TO CREATE AND PERFORM APPROPRIATE WORKFLOW FOR DATACENTER MIGRATION

BACKGROUND

Computing devices often exist in environments that include many such devices (e.g., servers, virtualization environments, storage devices, network devices, etc.). Such environments may, from time to time, in whole or in part, require being replicated (e.g., backed-up) and/or migrated (e.g., moved from one set of devices to another). Such replications and/or migrations often require large amounts of investigation, coordination, time, and manual steps to be performed by any number of system administrators.

SUMMARY

In general, embodiments described herein relate to a method for new endpoint addition. The method may include: receiving, during execution of a migration workflow, a request to add a new endpoint to the migration workflow, wherein the execution of the migration workflow comprises performing a first migration job associated with a first consistency group and assigned a first priority; making a first determination that the first priority is higher than a priority threshold; based on the first determination, completing the first migration job; performing, after completing the first migration job, a new endpoint addition action set. The new endpoint addition action set may include creating a new endpoint migration job for the new endpoint and assigning a new endpoint migration job priority to the new endpoint migration job. The method may also include adding, based on the new endpoint migration job priority, the new endpoint migration job to a queue of remaining migration jobs of the migration workflow.

In general, embodiments described herein relate to a non-transitory computer readable medium comprising computer readable program code, which when executed by a computer processor enables the computer processor to perform a method for new endpoint addition. The method may include: receiving, during execution of a migration workflow, a request to add a new endpoint to the migration workflow. The execution of the migration workflow may include performing a first migration job associated with a first consistency group and assigned a first priority. The method may also include making a first determination that the first priority is higher than a priority threshold; based on the first determination, completing the first migration job; performing, after completing the first migration job, a new endpoint addition action set. The new endpoint addition action set may include creating a new endpoint migration job for the new endpoint and assigning a new endpoint migration job priority to the new endpoint migration job. The method may also include adding, based on the new endpoint migration job priority, the new endpoint migration job to a queue of remaining migration jobs of the migration workflow.

In general, embodiments described herein relate to a system for new endpoint addition. The system may include a host addition device, comprising circuitry, and configured to: receive, during execution of a migration workflow, a request to add a new endpoint to the migration workflow. The execution of the migration workflow may include performing a first migration job associated with a first consistency group and assigned a first priority. The host addition device may also be configured to make a first determination that the first priority is higher than a priority threshold; based on the first determination, complete the first migration job; and perform, after completing the first migration job, a new endpoint addition action set. The new endpoint addition action set may include creating a new endpoint migration job for the new endpoint and assigning a new endpoint migration job priority to the new endpoint migration job. he host addition device may also be configured to add, based on the new endpoint migration job priority, the new endpoint migration job to a queue of remaining migration jobs of the migration workflow.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for creating and executing migration workflows to replicate or migrate data (collectively referred to herein as 'migration') from one device or set of devices to another device or set of devices (e.g., from one computing environment to another). In one or more embodiments, migrations involve obtaining information related to the computing devices that are the source of the data (e.g., source endpoints) and from computing devices to which data will be migrated (e.g., target endpoints).

In one or more embodiments, once endpoint information has been obtained, the endpoint information is classified and filtered to obtain a classified subset of the information. In one or more embodiments, classified information is information that has been classified based on any number of potential labels that describe the information. For example, the information may relate to a server, a storage device, a network device, etc. Additionally, there may be any number of layers of labels associated with a given endpoint, set of endpoints, or portion of an endpoint. For example, a server may have a certain set of processors, a certain type of storage storing one or more file system types, a certain operating system, certain applications with certain features enabled, etc. Any or all such information may be used as labels for classifying the endpoint information. In one or more embodiments, classified endpoint information may be filtered to reduce the incidence of duplicate information for the purposes of analysis during migration workflow creation. For example, if there are many network devices that are substantially configured and provisioned in the same way, one may be used for developing a migration workflow that will be applicable to the rest.

In one or more embodiments, after collection of endpoint information, a pre-requisite check may be performed. In one or more embodiments, a pre-requisite check includes assessing configuration details of the source endpoints (i. e., endpoints to be migrated) and of the target endpoints (i.e., endpoints that are to receive the migrated information). In one or more embodiments, such details are assessed to determine if the destination endpoints are properly configured to allow successful migration to occur from the source endpoints. In one or more embodiments, configuration of target endpoints must be the same as the configuration of the source endpoints for a migration to be successful. Configuration details may include, for example, storage settings, network settings, processor settings, etc. As an example, if source endpoints are configured with storage as redundant array of independent disks (RAID) 5, and target endpoints are configured as RAID 6, a migration from the source to the target may fail. In such a scenario, embodiments described herein may assess logs from the pre-requisite check to discern the difference between the source environment and the target environment and automatically re-configure the target environment to match the source environment. In the preceding example, the RAID 6 volumes of the destination endpoints may be re-configured as RAID 5 volumes prior to the migration to facilitate, at least in part, a successful migration.

In one or more embodiments, the classified and filtered endpoint information is provided to a migration analyzer. In one or more embodiments, the migration analyzer applies an analytics model to the information. For example, the migration analyzer may use a machine learning technique such as a multi-label classification algorithm to correlate the classified information with migration templates (e.g., mini templates, discussed further below) that are available in storage accessible to the migration analyzer. Such an algorithm may use the variety of labels associated with endpoint data to determine a correlation between the endpoint information and migration templates that are known or have been executed in the past for migrating endpoints from a source to a target computing environment. In one or more embodiments, if information relating to a given endpoint, set of endpoints, and/or portion of an endpoint has a correlation with an existing migration template that is above a pre-defined threshold, then that migration template may be selected for use as part of an overall migration workflow, and may be all or part of a migration job. In one or more embodiments, any number of migration jobs may be included in a migration workflow.

In one or more embodiments, there may be some level of non-correlation between an existing stored migration workflow and classified endpoint information, which may require additional input (e.g., user input) to complete the migration workflow for that endpoint information. Once such additional input is obtained, the migration workflow for the endpoint information may be stored in migration template storage for use the next time similar endpoint information is to be migrated (e.g., without requiring that the input be obtained again).

In one or more embodiments, if the migration analyzer determines that there is no stored migration workflow template with a correlation to the endpoint information that is above the pre-defined threshold, then a new migration template may be generated for the endpoint information, which may require user input. Such a new migration template may be then stored as a migration template in migration template storage for future use when migrating a similar set of endpoint information (e.g., a set of similarly configured storage volumes, a virtual machine (VM) host server, etc.). In one or more embodiments, such a migration template may be referred to as a tailored workflow.

In one or more embodiments, a migration workflow for a portion of the collected endpoint information (e.g., for a storage device, a server, a network device, etc.) may be referred to as a mini-workflow. In one or more embodiments, an overall migration workflow for migrating from a source to a target environment may include any number of mini-workflows. In one or more embodiments, the updating and/or addition of mini-workflows to the migration template storage improves the efficiency of migration of computing environments, because future migration request are increasingly serviced with less and less user input required, and are thus more automated. In other words, the training data available for use by the machine learning algorithm of the migration analyzer is improved over time, yielding more efficient results.

In one or more embodiments, mini-workflows from an overall migration workflow may be individually used to generate a new migration workflow. For example, consider a scenario in which there are two migration workflow templates available in template stores such as Job1-template and Job2-template. In one or more embodiments, a new migration request may require storage and network configuration from Job1_template and migration and endpoint configuration from Job2_template. By using the appropriate mini-workflows from the two templates, the required components may be combined and created as Job3_template to service the new migration request.

In one or more embodiments, once each portion of the endpoint information has been encompassed by the overall migration workflow (including any number of mini workflows, either from the migration template storage or created for the current migration, and any user input), the overall migration workflow is presented for approval. For example, there may be any number of stakeholders tasked with assessing the migration workflow, and providing consent that the migration workflow is appropriate for the migration that was requested. In one or more embodiments, once the overall migration workflow is approved, the migration is initiated.

As previously discussed, the migration workflow may include any number of migration jobs. Such migration jobs may each be associated with a consistency group. In one or more embodiments, a consistency group is a set of computing resources (e.g., set of storage volumes, related applications, related services, etc.) that are required to be migrated and/or backed up together, thereby ensuring consistency among the information in the group. In one or more embodiments, during execution of a migration workflow, migration jobs for consistency groups may be assigned a priority. As such, a migration workflow may be organized such that higher priority migration jobs occur before lower priority migration jobs. For example, a set of storage volumes that are part of a consistency group and have never been backed up may be assigned a high priority; a set of storage volumes that have been backed up a small number of times may be assigned a medium priority; and a set of storage volumes that have been backed up many times and are scheduled to be backed up on a frequent basis may be assigned a low priority. Such priority ranking may help ensure that endpoint information is migrated/backed-up in a comprehensive manner consistent with the expectations of the entity deploying the endpoint environments and/or requesting the migration.

In one or more embodiments, during execution of a migration workflow, a new device may be added to the source environment from which data is being migrated. For example, a new host server with connected storage may be added, and thus may need to be migrated. Such additions are often not able to be migrated until after completion of a currently executing migration workflow. However, one or more embodiments described herein may allow for a host to be added to a migration workflow during execution. In one or more embodiments, when a request to add a host is received, a job priority analyzer (e.g., part of a host addition device) may examine the priorities assigned to the various migration jobs of the currently executing migration workflow.

In one or more embodiments, if a migration job that is assigned a priority at or higher than a pre-defined threshold is executing, the new host addition may be halted until the high priority migration job completes. In one or more embodiments, once the migration job completes, a new consistency group is created for the new host, and a corresponding migration job is created and assigned a priority. In one or more embodiments, the new migration job is then placed into the queue of remaining migration jobs based on the assigned priority.

In one or more embodiments, if a currently executing migration job of the migration workflow is below a pre-defined priority threshold, then the migration job may be paused. Once the current migration job is paused, a new consistency group is created for the new host, and a corresponding migration job is created and assigned a priority. In one or more embodiments, the new migration job is then placed into the queue of remaining migration jobs based on the assigned priority. In one or more embodiments, adding a new host to the queue of migration jobs of a currently executing migration workflow allows for the new host to be migrated before completion (i. e., during) the currently executing migration workflow rather than after the migration workflow has completed, thereby resulting in a more efficient and complete migration solution.

Figure 1A:
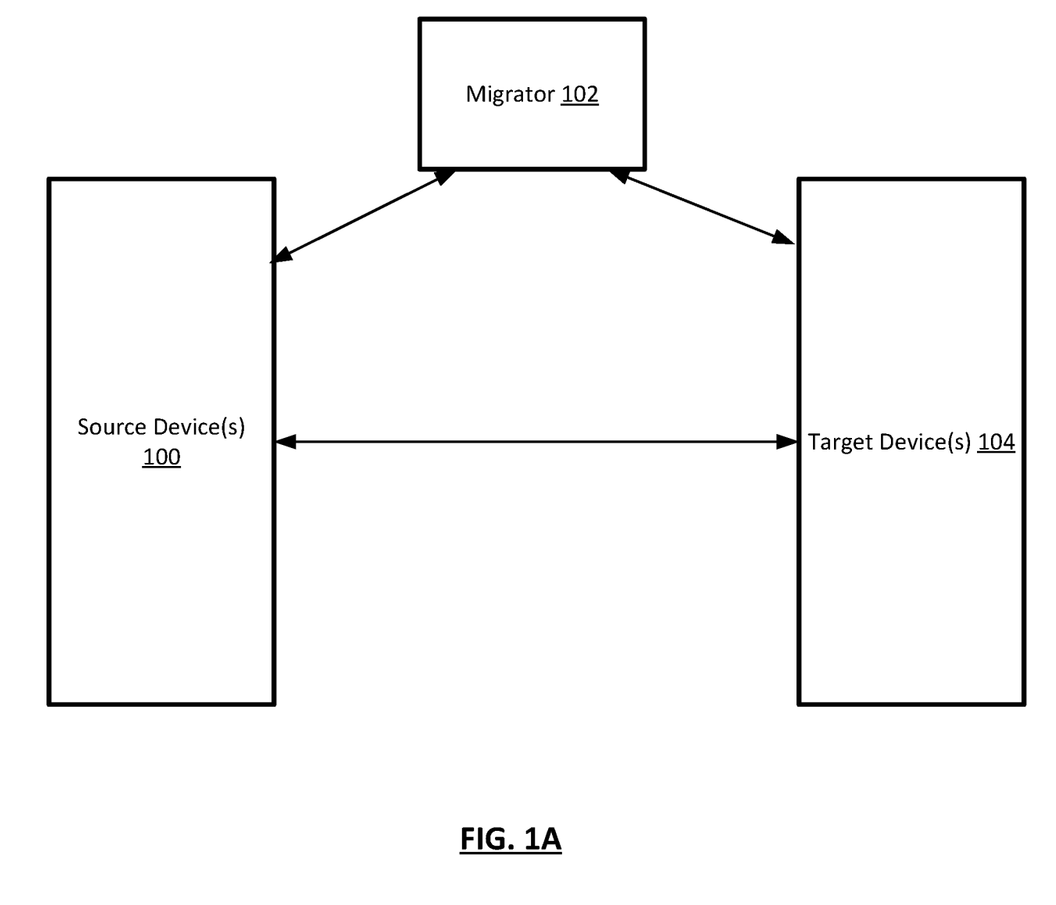
FIG. 1A shows a diagram of a system in accordance with one or more embodiments of the invention.

FIG. 1A shows a diagram of a system in accordance with one or more embodiments described herein. The system may include any number of source devices (100), and any number of target devices (104). The system may also include a migrator (102) operatively connected to the source devices (100) and to the target devices (104). Each of these components is described below.

In one or more embodiments, the source devices (100) and the target devices (104) may be computing devices. Such computing devices may be referred to as endpoints. In one or more embodiments, an endpoint is any computing device, collection of computing devices, portion of one or more computing devices, or any other logical grouping of computing resources. In one or more embodiments, the source devices (100) may collectively be referred to as a source environment. Similarly, in one or more embodiments, target devices (104) may collectively be referred to as a target environment. In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention. In one or more embodiments, a set of computing devices (100) may form all or a portion of a data domain, all or part of which may require being migrated (e.g., re-located, backed-up, etc.) from time to time (e.g., upon request and/or pursuant to a defined schedule). In one or more embodiments, a data domain is any set of computing devices (100) for which migration services are performed, such as, for example, data backup, disaster recovery, backup data deduplication, re-location to updated/newer computing devices, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes a migrator (102). In one or more embodiments, the migrator (102) is operatively connected to both the source devices (100) and the target devices (104). A migrator (102) may be located within a source environment, within a target environment, or separate from and connected to both environments. In one or more embodiments, the migrator (102) is a computing device. In one or more embodiments, a computing device (100) is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, a computing device includes and/or is operatively connected to any number of storage volumes (not shown). In one or more embodiments, a volume is a logically accessible storage element of a computing system. A volume may be part of one or more disk drives, and may include, or not, any number of partitions. In one or more embodiments, a volume stores information relevant to the operation and/or accessible data of a computing device. In one or more embodiments, a volume may be all or part of any type of computing device storage (described above).

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The migrator (102), and components, therein are discussed further in the description of FIGS. 1B and 1C, below.

In one or more embodiments, the source devices (100), the migrator (102), and/or the target devices (104) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
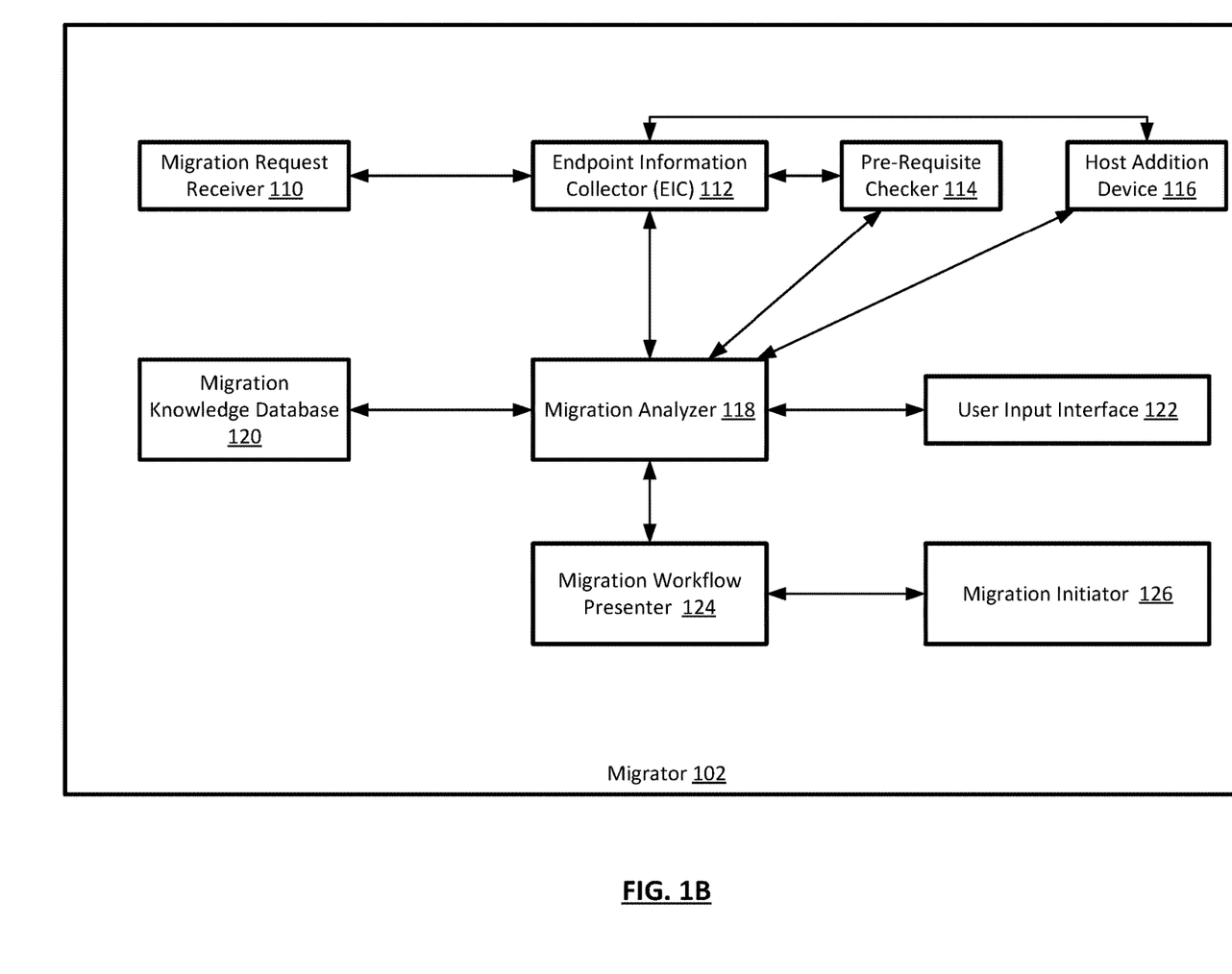
FIG. 1B shows a diagram of a migrator in accordance with one or more embodiments of the invention.

FIG. 1B shows a diagram of a migrator (102) in accordance with one or more embodiments described herein. The migrator (102) may include any number of components. As shown in FIG. 1B, the migrator (102) includes a migration request receiver (110), an endpoint information collector (EIC) (112), a pre-requisite checker (114), a host addition device (116), a migration analyzer (118), a migration knowledge database (120), a user input interface (122), a migration workflow presenter (124), and a migration initiator (126). Each of these components is described below.

In one or more embodiments, a migrator (102) is a computing device, as discussed above in the description of FIG. 1A.

In one or more embodiments, the migrator (102) includes a migration request receiver (110). In one or more embodiments, a migration request receiver (110) is any hardware (e.g., circuitry), software, firmware, or any combination thereof that includes functionality to receive a request that all or any portion of a source environment (e.g., source devices (100) of FIG. 1A) be migrated to a target environment (e.g., target devices (104) of FIG. 1A). In one or more embodiments, such a migration request may be received via a user interface (not shown), may be received on a recurring basis as part of a planned migration scheme, may be received as part of a planned computing environment upgrade, etc. A migration request may be for any type of migration or combination of migration types. Examples of migration types include, but are not limited to: storage array to hyper-converged infrastructure (HCI); host server to host server, VM environment to HCI, storage array to storage array, hypervisors to hypervisors, host servers to storage array, on-premise computing devices to a cloud environment and vice versa, application servers to application servers (e.g., older Exchange server to either a newer on-premise Exchange server or to a cloud-based Exchange service), different source to target endpoints that may be from vendors that are unique and different, backup of all or part of a data center environment, etc. One of ordinary skill in the art, having the benefit of this Detailed Disclosure will appreciate that any other type of migration may be requested without departing from the scope of embodiments described herein.

In one or more embodiments, the migrator (102) includes an EIC (112) operatively connected to the migration request receiver (110). In one or more embodiments, an EIC (112) is any hardware (e.g., circuitry), software, firmware, or any combination thereof that includes functionality to obtain endpoint information from source devices and target devices. In one or more embodiments, endpoint information is obtained in any manner capable of collecting data from or about computing devices.

Such endpoint information may include, but is not limited to: system types, license information, software versions, virtualization environment details, operating system information, virtual machine information, source and target device identification information, endpoint organization information (e.g., cluster membership), HCI details information, storage configuration information, storage array details (e.g., RAID level configuration information), disk information (e.g., disk type, disk layout, etc.), network configuration information, interface connection information, network speed information, network adapter information, network addresses, feature enablement information, endpoint system setting information (e.g., BIOS information), file system information, storage management initiative specification (SMIS) object information, protocol information, device type information, cache policy information, spare storage information, storage controller information, storage area network information, operating system information, file system information, application information and settings, process identifiers, common object model (COM) object information, etc. One having ordinary skill in the art will appreciate that any other type of information that could be associated with all or any portion of computing devices or with any portion thereof in a computing environment may be considered endpoint information without departing from the scope of embodiments described herein.

In one or more embodiments, the migrator (102) includes a pre-requisite checker (114) operatively connected to the EIC (112). In one or more embodiments, a pre-requisite checker (114) is any hardware (e.g., circuitry), software, firmware, or any combination thereof that includes functionality to obtain endpoint information from the EIC (112), and use the information to perform one or more pre-requisite checks.

In one or more embodiments, a pre-requisite check is an analysis of a target environment for a migration, relative to the source environment, to identify whether any inconsistencies may exist that would cause a requested migration to fail. For example, the pre-requisite checker (114) may determine if any storage characteristics, network configuration, computing device processor settings, etc. are different in the target environment relative to the source environment. In one or more embodiments, the pre-requisite checker includes functionality to assess each difference discovered during the pre-requisite check (which may be captured in pre-requisite check logs), and to take actions to mitigate the differences discovered. Such actions may be taken, for example, by using any application programming interface, command line interface, etc. that is capable of adjusting the configuration of target devices in the target environment.

In one or more embodiments, the migrator (102) includes a host addition device (116) operatively connected to the EIC (112). In one or more embodiments, a host addition device (116) is any hardware (e.g., circuitry), software, firmware, or any combination thereof that includes functionality to obtain endpoint information from the EIC (112) in response to a request to add a new endpoint (e.g., host server) to a source environment that is being migrated as part of a migration workflow, and to generate a new migration job for the new host and add it to a migration workflow. In one or more embodiments, when a new host is added to a source environment that is being migrated by a migration workflow, the host may be added to the migration workflow instead of having to wait until the migration workflow has been completed. In one or more embodiments, when a request to add a new host is received, the host addition device (116) invokes a job priority analyzer (not shown) to determine what action to take.

In one or more embodiments, the job priority analyzer determines the priority assigned to the migration jobs of the currently executing migration workflow, which may be assigned by the job priority analyzer at that time, and/or which may have been assigned to the migration jobs prior to the new host addition. In one or more embodiments, the priority assigned to migration jobs of a migration workflow determines the order that the jobs are placed within a queue that determines the order of execution of the migration jobs. In one or more embodiments, a migration job of a migration workflow is a portion of the migration workflow associated with a consistency group. In one or more embodiments, a consistency group is a set of computing resources (e.g., set of storage volumes, related applications, related services, etc.) that are required to be migrated and/or backed up together, thereby ensuring consistency among the information in the group.

In one or more embodiments, during execution of a migration workflow, migration jobs for consistency groups may be assigned a priority. As such, a migration workflow may be organized such that higher priority migration jobs occur before lower priority migration jobs. For example, a set of storage volumes that are part of a consistency group and have never been backed up may be assigned a high priority; a set of storage volumes that have been backed up a small number of times may be assigned a medium priority; and a set of storage volumes that have been backed up many times and are scheduled to be backed up on a frequent basis may be assigned a low priority.

In one or more embodiments, the job priority analyzer of the host addition device (116) determines the priority assigned to a currently executing migration job. In one or more embodiments, if the priority is higher than a priority threshold, then the new host addition request is not serviced until the current migration job is completed. For example, if the threshold is above low priority, then any medium or high priority job will be completed. In one or more embodiments, if the priority of the currently executing migration job is below the threshold, then the migration job is paused. For example, if the threshold is above a low priority, then a migration job assigned a low priority is paused.

In one or more embodiments, after completion of a migration job above a priority threshold, or after pausing a migration job below a priority threshold, the host addition device (116) services the new host addition request. In one or more embodiments, servicing the new host addition request includes using the EIC (112) to gather endpoint information about the new host, to create one or more new consistency group(s) for the new host, to create a new migration job for the new consistency group, and to assign a priority to the new migration job. In one or more embodiments, the host addition device (116) includes functionality to place the new migration job into the queue of remaining migration jobs of a migration workflow based on the assigned priority. As such, in one or more embodiments, the new migration job is integrated into the existing and currently executing migration workflow before the migration workflow completes.

In one or more embodiments, each of the EIC (112), the pre-requisite checker (114), and the host addition device (116) of the migrator (102) are operatively connected to a migration analyzer (118). In one or more embodiments, a migration analyzer (118) is any hardware (e.g., circuitry), software, firmware, or any combination thereof that includes functionality to obtain endpoint information from the EIC (112), and to analyze the information to develop a migration workflow that includes any number of mini-workflows to perform a migration of source endpoints to target endpoints as part of a requested migration. In one or more embodiments, the migration analyzer includes functionality to classify and filter endpoint information, and apply artificial intelligence via machine learning techniques (e.g., multi-label correlation algorithms) to the endpoint information to associate portions of the endpoint information with mini-workflow templates available in a migration knowledge database (discussed below) as part of building a migration workflow. The migration analyzer is discussed in more detail in the description of FIG. 1C, below.

In one or more embodiments, the migration analyzer (118) is operatively connected to a migration knowledge database (120). In one or more embodiments, a migration knowledge database (120) is a data storage of any type that includes functionality to store migration workflows as sets of discrete mini-workflows that may be labeled based on the characteristics of endpoint information that may be migrated using the mini-workflow. In one or more embodiments, the migration knowledge database (120) includes a starting set of known mini-workflows for migrating a variety of standard endpoint types, as well as, all, or any, portion of previously executed workflow templates, which are stored in the migration knowledge database as migration workflows are executed, thereby expanding the migration knowledge database to encompass migrations of new endpoints as they are encountered. As such, future migrations may become more efficient as the database grows to have more and more mini-workflow templates that encompass an increasingly large set of possible endpoint migration scenarios.

In one or more embodiments, when a similar migration request is received, the stored workflow templates will be reused instead of creating an entirely new workflow. In one or more embodiments, the mini-workflows of the migration knowledge database (120) may be combined and/or re-combined in any way to form part of a new migration workflow, rather than only being used for the same type of overall migration workflow, for which the mini workflow was originally used. For example, a new migration request may cause the migration analyzer to create a new migration workflow that uses certain mini-workflows from one previously executed migration workflow, and other mini-workflows from other previously executed migration workflows, to build a new migration workflow for the new request using the existing mini-workflows, instead of having to re-create each mini-workflow and/or an overall migration workflow.

In one or more embodiments, the migration analyzer (118) is also operatively connected to a user input interface (122). In one or more embodiments, a user input interface (122) is any hardware (e.g., circuitry), software, firmware, or any combination thereof that includes functionality to receive or otherwise obtain any user input required to generate a complete migration workflow. In one or more embodiments, if a migration analyzer identifies a certain mini-workflow that meets a minimum threshold as acceptable to use as part of a migration workflow to migrate a portion of the endpoint information of source endpoints, additional user input may still be required to add to the mini workflow as additional information to facilitate the migration. In one or more embodiments, such additional information may be used to augment the selected mini-workflow, and such an augmented mini-workflow may be added as a new mini-workflow to the migration knowledge database (120) to be used in future migration workflow building, which may reduce the need for at least some future user input during the building of a migration workflow in response to a migration request. In one or more embodiments, user input may be received via the user input interface (122) via any method of receiving information. For example, a user may be presented with a graphical or command line interface that prompts a user to enter requested information.

In one or more embodiments, the migration analyzer (118) is operatively connected to a migration workflow presenter (124). In one or more embodiments, a migration workflow presenter (124) is any hardware (e.g., circuitry), software, firmware, or any combination thereof that includes functionality to present a migration workflow for approval to any one or more approving entities (not shown). In one or more embodiments, once a migration workflow has been developed for a requested migration, the entire migration workflow may be presented to any number of entities that are responsible for the migration. For example, stakeholders such as data center administrators, network administrators, system administrators, decision makers for an entity in control of a data center, etc. may each have to approve a migration workflow before a migration may take place. Accordingly, a migration workflow presenter (124) may include functionality to present the proposed migration workflow to such entities.

In one or more embodiments, the migration workflow presenter (124) is operatively connected to a migration initiator (126). In one or more embodiments, a migration initiator (126) is any hardware (e.g., circuitry), software, firmware, or any combination thereof that includes functionality to initiate a migration once the migration has been approved after presentation by a migration workflow presenter (124). In one or more embodiments, initiating a migration includes beginning execution of migration workflow jobs of a migration workflow in an order determined by a queue of migration jobs that is created based on the relative priority of the migration jobs. In one or more embodiments, a new host addition via a new host addition device (116) may pause a migration workflow to add a new migration job for a new consistency group for the new host as discussed above.

While FIG. 1B shows a configuration of components, other configurations may be used without departing from the scope of embodiments described herein. For example, although FIG. 1B shows all components as part of the same device, any of the components may be grouped in sets of one or more components which may exist and execute as part of any number of separate and operatively connected devices. Accordingly, embodiments disclosed herein should not be limited to the configuration of components shown in FIG. 1B.

Figure 1C:
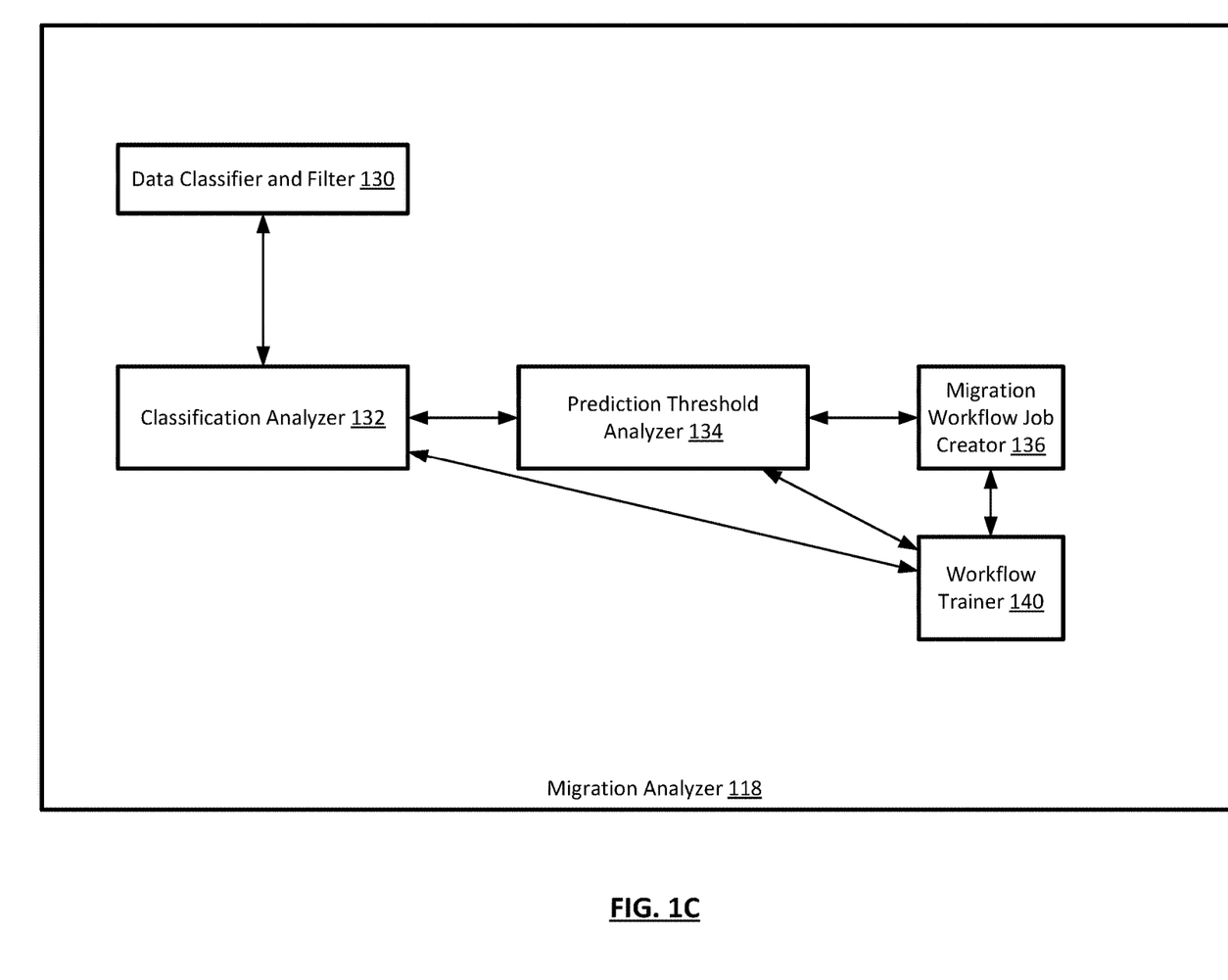
FIG. 1C shows a diagram of a migration analyzer in accordance with one or more embodiments of the invention.

FIG. 1C shows a diagram of a migration analyzer (118) in accordance with one or more embodiments described herein. The migration analyzer (118) may include any number of components. As shown in FIG. 1C, the migration analyzer (118) includes a data classifier and filter (130), classification analyzer (132), a prediction threshold analyzer (134), a migration workflow job creator (136), and a workflow trainer (140). Each of these components is described below.

In one or more embodiments, the migration analyzer includes a data classifier and filter (130). In one or more embodiments, a data classifier and filter (130) is any hardware (e.g., circuitry), software, firmware, or any combination thereof that includes functionality to classify and filter endpoint information. In one or more embodiments, filtering endpoint information includes identifying endpoint information that is duplicative, which allows for the duplicative information not to be redundantly analyzed by a classification analyzer.

For example, many host servers with the same or substantially similar configurations may be migrated using the same base mini-workflow as part of a migration workflow. As such, each such host server endpoint information need not be independently analyzed, which is achieved by filtering out the redundant endpoint information.

In one or more embodiments, classifying endpoint information includes identifying characteristics and aspects of portions of the endpoint information that may be assigned any number of labels. For example, a given host server may be classified by labels for the server type, the server processor configuration, the server settings, the operating system type and version deployed on the server, the applications and setting existing within the operating system, etc. Any such item of information may be used to create a label for classifying endpoint information. Any number of labels may be applied to any portion of endpoint information, and may be arranged as a hierarchy of labels. For example, a server of a given vendor may be a top level label, the operating system type may be a second level label, and the applications within the operating system may be a third level label. Any set of labels applied to classify a portion of endpoint information may be referred to as a multi-label set for that portion of endpoint information.

In one or more embodiments, the data classifier and filter (130) is operatively connected to a classification analyzer (132). In one or more embodiments, a classification analyzer (132) is any hardware (e.g., circuitry), software, firmware, or any combination thereof that includes functionality to analyze the multiple labels assigned to a given portion of endpoint information (e.g., by a data classifier and filter (130)) relative to known labels associated with workflow information (e.g., mini-workflows) of a migration knowledge database (e.g., migration knowledge database (120, FIG. 1B). In one or more embodiments, the classification analyzer (132) applies a machine learning algorithm to analyze the labels of portions of the endpoint data against the data set of known mini-workflows for migrations of endpoint information. In one or more embodiments, a given portion of the endpoint information, with assigned labels is compared with a data set that includes past results of such analysis, and a probability is assigned that the endpoint information having the multi-label set is correlated to existing mini-workflows. In one or more embodiments, such multi-label analysis is performed for each portion of the endpoint information of the migration request that has been classified by assigning of labels. The result of such analysis may be a percentage of correlation prediction. For example, a given portion of endpoint information may be determined to have an 85% probability of being properly correlated to a given mini-workflow.

In one or more embodiments, the classification analyzer (132) is operatively connected to a prediction threshold analyzer (134). In one or more embodiments, a prediction threshold analyzer (134) is any hardware (e.g., circuitry), software, firmware, or any combination thereof that includes functionality to receive a prediction probability percentage from a classification analyzer and compare it against a pre-determined threshold. In one or more embodiments, a pre-determined threshold is a threshold that dictates whether a mini-workflow is suitable for migrating a portion of endpoint information from a source environment to a target environment. In one or more embodiments, if the probability prediction is above the pre-determined threshold, the identified mini-workflow is used, although it may require a relatively small amount of user input. The results of such user input may be stored in the migration knowledge database for use in analyzing future migration requests and reducing the amount of user input required to service such requests. In one or more embodiments, if the probability prediction is below the pre-defined threshold, the prediction threshold analyzer (134) may determine that a new workflow job should be created for the endpoint information. In one or more embodiments, the new migration job may be created, and also stored as a new mini-workflow in the migration knowledge database for use in building future migration workflows in response to migration requests.

In one or more embodiments, the prediction threshold analyzer (134) is operatively connected to a migration workflow job creator (136). In one or more embodiments, a migration workflow job creator (136) is any hardware (e.g., circuitry), software, firmware, or any combination thereof that includes functionality to create a migration workflow template, which may include any number of mini-workflows. Such mini-workflows may be workflow jobs obtained from a migration knowledge database based on a correlation to endpoint information portions to be migrated being above a threshold, and/or may be base templates for creating new mini-workflows. Either or both the aforementioned types of mini-workflow templates may be provided to a workflow trainer (140), which may request and receive relevant user input to complete the mini-workflows of the migration workflow template. In one or more embodiments, the migration workflow template, and mini-workflows therein, may be stored as part of the migration knowledge database. In one or more embodiments, a completed migration workflow may be presented to certain entities via a migration workflow presenter (e.g., migration workflow presenter (124, FIG. 1B).

While FIG. 1C shows a configuration of components, other configurations may be used without departing from the scope of embodiments described herein. For example, although FIG. 1C shows all components as part of the same device, any of the components may be grouped in sets of one or more components which may exist and execute as part of any number of separate and operatively connected devices. Accordingly, embodiments disclosed herein should not be limited to the configuration of components shown in FIG. 1C.

Figure 2A:
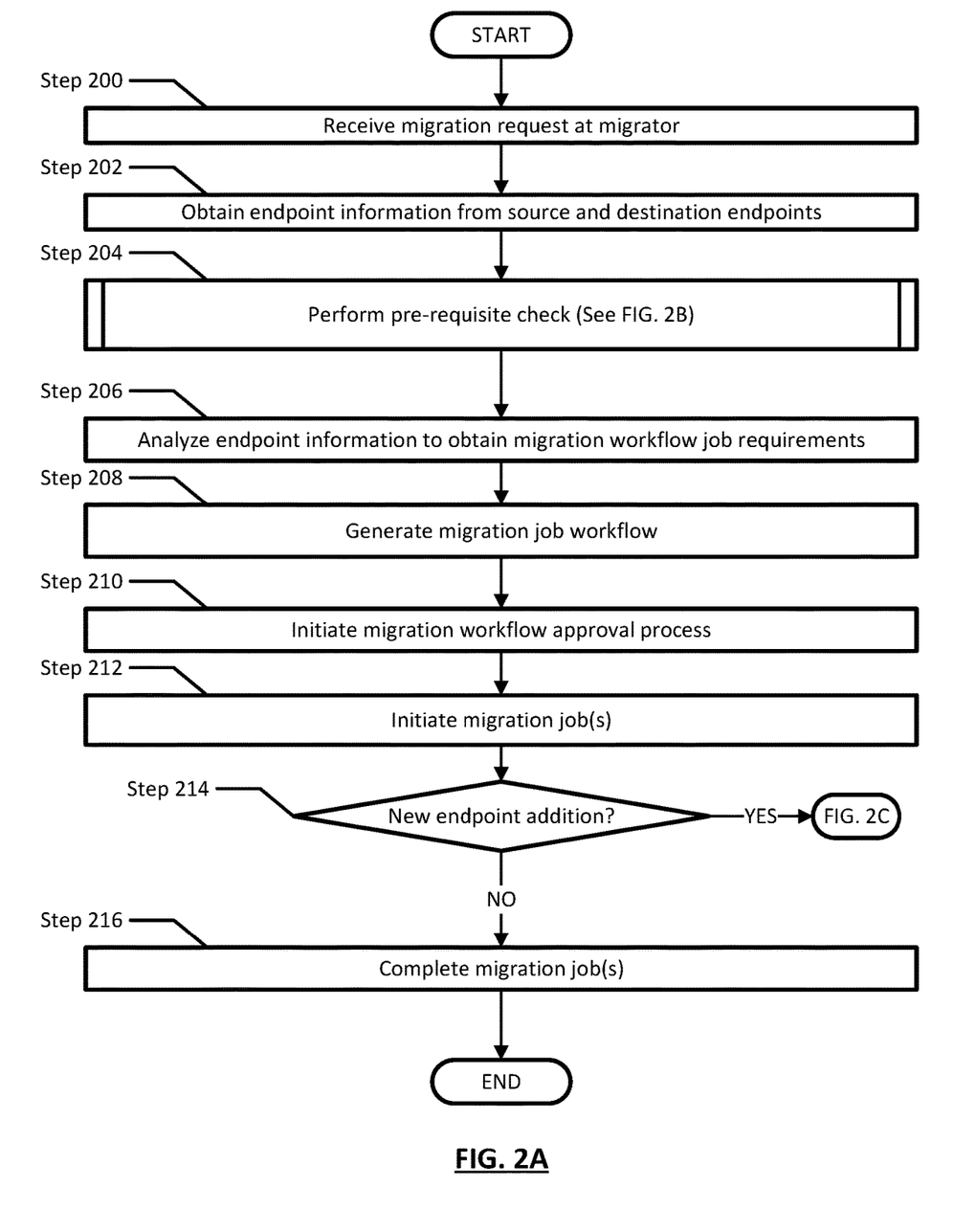
FIG. 2A shows a flowchart in accordance with one or more embodiments of the invention.

FIG. 2A shows a flowchart describing a method for building end executing a migration workflow in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a request is received to migrate any amount of endpoint information of any number of source devices from a source environment to a target environment. In one or more embodiments, the migration request is received by a migrator.

In Step 202, the migrator obtains endpoint information from all source devices of the source environment and all target devices of the target environment. In one or more embodiments, endpoint information is obtained using any known method of obtaining information from a computing device, such as Command Line Interface (CLI) commands, application programming interfaces (APIs), log examination, etc.

In Step 204, the migrator uses the endpoint information to perform a pre-requisite check for the requested migration. In one or more embodiments, the pre-requisite check yields differences, if any, between the configuration of the source environment and the target environment. In one or more embodiments, the migrator resolves the differences, if any, by altering the configuration of the target environment to conform to the configuration of the source environment. The pre-requisite check is discussed in more detail in the description of FIG. 2B, below.

In Step 206, the endpoint information is analyzed to obtain migration workflow job requirements, and corresponding workflow components for a migration workflow. In one or more embodiments, analyzing the endpoint information includes, but is not limited to, filtering out redundant endpoint information, classifying endpoint information portions by assigning multiple labels to the portions, executing a machine learning multi-label classification algorithm to correlate the endpoint information portions to mini-workflows that exist in a migration knowledge database, and determining if the discovered correlations are above or below a prediction probability threshold.

In Step 208, a migration workflow is created. In one or more embodiments, the migration workflow is a collection of mini-workflows that are based on existing workflows for which the probability prediction is above the aforementioned threshold, and/or new mini-workflows created for the migration workflow for endpoint information portions for which there was not any mini-workflow identified with a strong enough correlation. In one or more embodiments, generation of a migration workflow also includes obtaining any required user input to complete re-used or new mini-workflows that are part of the overall migration workflow.

In Step 210, a migration workflow approval process is initiated. In one or more embodiments, the migration workflow approval process includes presenting the completed proposed migration workflow to any number of stakeholder entities, each of which must approve of the migration workflow.

In Step 212, once the migration workflow has been approved by relevant entities in Step 210, a migration is initiated using the migration workflow.

In Step 214, during execution of a migration workflow, a determination is made as to whether a new endpoint (e.g., new host) addition has been requested. In one or more embodiments, if a request has been received to add a new endpoint to a migration workflow, then the process proceeds to FIG. 2C. In one or more embodiments, if no request is received to add a new endpoint to the migration workflow, then the process proceeds to Step 216, and the remaining migration jobs of the migration workflow are completed in order of their relative priority.

Figure 2B:
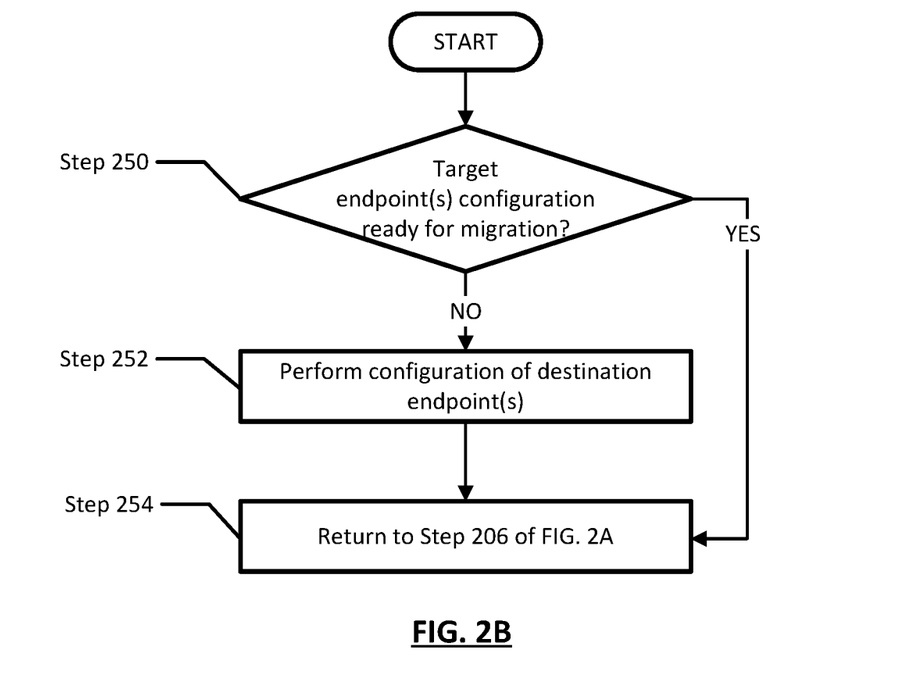
FIG. 2B shows a flowchart in accordance with one or more embodiments of the invention.

FIG. 2B shows a flowchart describing a method for performing a pre-requisite check before executing a migration workflow in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 250, a determination is made as to whether the configuration of target environments of a target migration environment is ready for migration. In one or more embodiments, a target environment is ready for a migration if the target environment is configured in the way that the source environment being migrated from, is configured. In one or more embodiments, if the target environment is ready for the migration, the method proceeds to Step 254, and returns to Step 206 of FIG. 2A. In one or more embodiments, if the target environment is not configured in such a way as to be ready for a migration, the migrator uses whatever APIs, command line interfaces, etc. are necessary to modify the configuration of the target environment to match that of the source environment.

In Step 252, after configuration of the target environment or a determination that no such additional configuration is required, the method proceeds to Step 254, and, thus, to Step 206 of FIG. 2A.

Figure 2C:
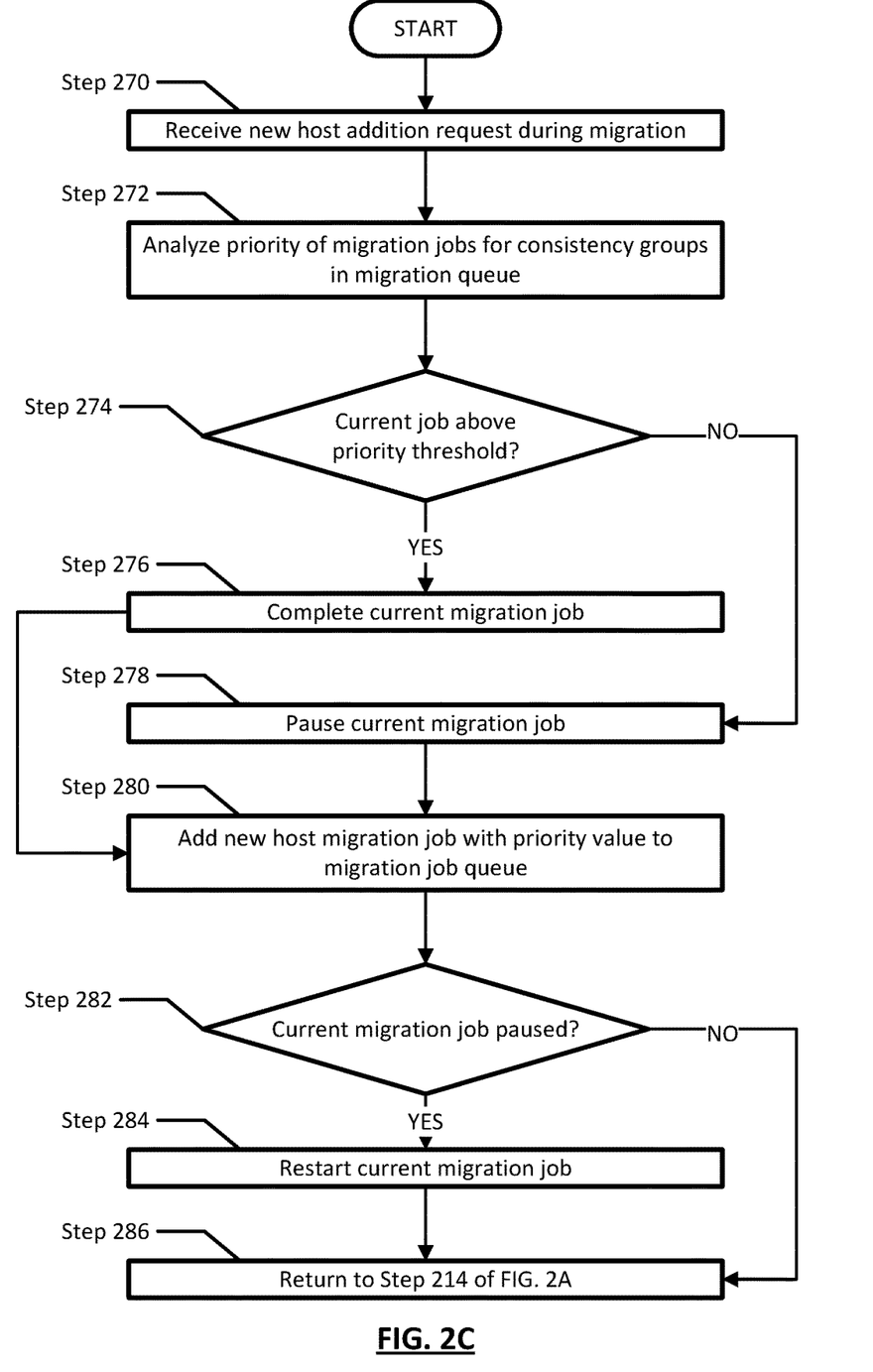
FIG. 2C shows a flowchart in accordance with one or more embodiments of the invention.

FIG. 2C shows a flowchart describing a method for adding a host to a migration workflow while executing a migration workflow in accordance with one or more embodiments disclosed herein.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 270, a request is received to add a new host to a source environment of a migration for which a migration workflow is being executed.

In Step 272, a job priority analyzer of a host addition device analyzes the priorities of the migration jobs of the currently executing migration workflow. In one or more embodiments, such an analysis yields the relevant priorities, which may be used to compare against the priority assigned to the migration job created for a new host added to a source environment.

In Step 274, a determination is made as to whether a currently executing migration job of the migration workflow is above a priority threshold. For example, if a priority threshold is anything above low, then medium and high priorities may be above the threshold, while low priorities are not. In one or more embodiments, if the priority is at or above the priority threshold, the method proceeds to Step 276. In one or more embodiments, if the priority is below the priority threshold, the method proceeds to Step 278.

In Step 276, the current migration job is completed before the new host is analyzed and added to the migration workflow queue. In one or more embodiments, analysis of the new host includes collecting information about the new host using an EIC, performing any necessary pre-requisite check, analyzing the information from the EIC relative to migration mini workflow templates in a migration template storage, determining whether an existing or new migration template is necessary, obtaining any necessary user input, etc.

In Step 278, the current migration job is paused, and the new host for which an addition is requested is analyzed to be added to the migration workflow.

In one or more embodiments, analysis of the new host includes collecting information about the new host using an EIC, performing any necessary pre-requisite check, analyzing the information from the EIC relative to migration mini workflow templates in a migration template storage, determining whether an existing or new migration template is necessary, obtaining any necessary user input, etc.

In Step 280, the new host that was analyzed is assigned a priority value, and added to the queue of migration jobs for the currently executing migration workflow based, at least in part, on the assigned priority.

In Step 282, a determination is made as to whether the new host addition was conducted during a pause of a currently executing migration job. In one or more embodiments, if the current migration job was paused, then the method proceeds to Step 284, and the migration job is completed, and then proceeds to Step 286. In one or more embodiments, if the migration job was not paused (i.e., the migration job had a sufficiently high priority to not be paused after Step 274), then the method proceeds to Step 286.

In Step 286, the method returns to Step 214 of FIG. 2A, and the migration workflow execution is continued.

Example Use Case 1

Consider a scenario in which a source environment includes 1000 servers, each with attached storage and defined network configurations, which are executing copies of an application. In such a scenario, an entity in control of the servers may want to move the servers from an older model of the server to a newer model of server. Therefore, a migrator receives a request for the migration to be performed.

Next, an EIC collects information from the servers in the source environment and the new servers in the target environment. A pre-requisite checker determines that the RAID configuration of the target servers does not match that of the source servers. Therefore, the pre-requisite checker uses CLI interfaces to re-configure the RAID configuration of the target environment to match that of the source environment.

Next, a migration analyzer uses the endpoint information collected by the EIC, which has been filtered and classified, to determine a correlation between portions of the endpoint information and mini workflow templates stored in a migration workflow storage. The migration analyzer determines that the server, operating system, application, and storage configurations have a correlation to existing mini-templates that is above a pre-defined threshold. Therefore, the existing mini workflow templates are used as part of the new migration workflow. The operating system and application mini templates require a small amount of user input, so a request for the same is included in the migration workflow, and the eventual input answers are stored back into the migration template storage for use in future migration workflow creation.

The network configuration of the source environment, as analyzed by the migration analyzer, does not have a corresponding mini workflow template with a strong correlation based on a multi-label machine learning analysis and application. Accordingly, a new migration workflow template is created for the networking configuration, which requires user input. After creation and receipt of the user input, the resulting network configuration mini workflow is also added back to the migration workflow storage for use in future migration workflow creation.

Once the overall migration workflow is generated, as described above, the migration workflow is presented to several stakeholders tasked with approving the workflow. Once approved, the migration is initiated, and the endpoint information from the source environment begins being migrated to the target environment.

Example Use Case 2

Consider a scenario where the migration is a backup of storage from source storage devices to destination storage devices (i.e., backup storage). In such a scenario, a portion of the source storage devices have been backed up once a day for the past three months. Another portion of the source storage devices have been only backed up a few times. A third portion of storage devices have not yet been backed up.

In such a scenario, the first portion of storage devices are assigned a low priority for backup, the second portion are assigned a medium priority, and the third portion are assigned a high priority.

Next, the entity in control of the source environment adds a new host with storage to the source environment, and therefore requests that the new host be added to the current migration workflow. In response to the request, a new host addition device assesses the current migration job and determines that the currently executing migration job is performing a backup of a high priority source device. The priority threshold for the migration workflow is set at the cutoff from low to medium jobs. Therefore, the current migration job for the high priority job is completed. Once completed, the new host is analyzed, and a determination is made that the new host should be assigned a medium priority. Therefore, the new host is added to the queue of migration jogs at a position after the high and medium priority jobs of the current migration workflow and before the low priority migration jobs.

Next, the entity in control of the source environment adds another new host with storage to the source environment, and therefore requests that the new host be added to the current migration workflow. In response to the request, a new host addition device assesses the current migration job and determines that the currently executing migration job is performing a backup of a low priority source device. The priority threshold for the migration workflow is set at the cutoff from low to medium jobs. Therefore, the current migration job for the low priority job is paused. Once paused, the new host is analyzed, and a determination is made that the new host should be assigned a high priority. Therefore, the new host is added to the queue of migration jogs at a position after the high priority jobs of the current migration workflow and before the low priority migration jobs. Next, the low priority migration job that was paused is restarted and completed. Once it is completed, because the new host was assigned a high priority, the new most migration is completed before the migration workflow continues with the additional low priority migration jobs.

Figure 3:
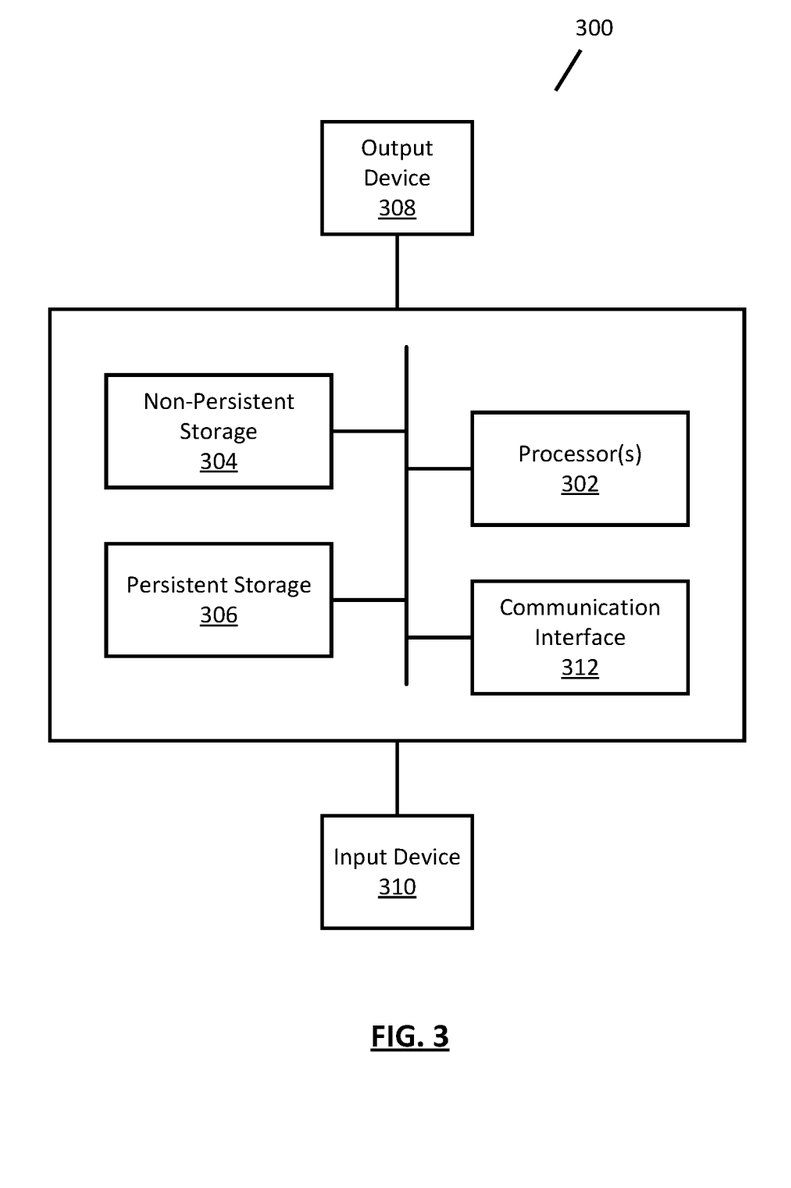
FIG. 3 shows a computing system in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for new endpoint addition, the method comprising:
   receiving, during execution of a migration workflow, a request to add a new endpoint to the migration workflow, wherein the execution of the migration workflow comprises performing a first migration job associated with a first consistency group and assigned a first priority;
   making a first determination that the first priority is higher than a priority threshold;
   based on the first determination, completing the first migration job;
   performing, after completing the first migration job, a new endpoint addition action set comprising:
      creating a new endpoint migration job for the new endpoint; and
      assigning a new endpoint migration job priority to the new endpoint migration job; and
   adding, based on the new endpoint migration job priority, a remaining migration job associated with the new endpoint migration job to a queue of the migration workflow,
   wherein after adding the new endpoint migration job to the queue, receiving, during the execution of the migration workflow, a second request to add a second new endpoint to the queue of the migration workflow,
   wherein the execution of the migration workflow further comprises performing a second migration job associated with a second consistency group and assigned a second priority.

2. The method of claim 1, further comprising:
   assigning the first priority to the first migration job that is higher than the priority threshold; and assigning the second priority to the second migration job of the migration workflow that is lower than the priority threshold.

3. The method of claim 2, further comprising:
making a second determination that the second priority is lower than the priority threshold;
based on the second determination, pausing the second migration job;
performing, after pausing the second migration job, a second new endpoint addition action set comprising:
  creating a second new endpoint migration job for the second new endpoint; and
  assigning a second new endpoint migration job priority to the second new endpoint migration job; and
  adding, based on the new endpoint migration job priority, the second new endpoint migration job to the queue.

4. The method of claim 3, further comprising:
after adding the second new endpoint migration job to the queue, restarting the second migration job.

5. The method of claim 4, further comprising:
after completing the second migration job, performing the second new endpoint migration job before any of the remaining migration jobs based on the new endpoint migration job priority.

6. The method of claim 1, wherein the first priority and a set of priorities for the remaining workflow jobs are based on a migration workflow history.

7. A non-transitory computer readable medium comprising computer readable program code, which when executed by a computer processor enables the computer processor to perform a method for new endpoint addition, the method comprising:
receiving, during execution of a migration workflow, a request to add a new endpoint to the migration workflow, wherein the execution of the migration workflow comprises performing a first migration job associated with a first consistency group and assigned a first priority;
making a first determination that the first priority is higher than a priority threshold;
based on the first determination, completing the first migration job;
performing, after completing the first migration job, a new endpoint addition action set comprising:
  creating a new endpoint migration job for the new endpoint; and
  assigning a new endpoint migration job priority to the new endpoint migration job; and
adding, based on the new endpoint migration job priority, a remaining migration job associated with the new endpoint migration job to a queue of the migration workflow,
wherein after adding the new endpoint migration job to the queue, receiving, during the execution of the migration workflow, a second request to add a second new endpoint to the queue of the migration workflow,
wherein the execution of the migration workflow further comprises performing a second migration job associated with a second consistency group and assigned a second priority.

8. The non-transitory computer readable medium of claim 7, wherein the method executed by the instructions further comprising:
assigning the first priority to the first migration job that is higher than the priority threshold; and
assigning the second priority to the second migration job of the migration workflow that is lower than the priority threshold.

9. The non-transitory computer readable medium of claim 8, wherein the method executed by the instructions further comprises:
making a second determination that the second priority is lower than the priority threshold;
based on the second determination, pausing the second migration job;
performing, after pausing the second migration job, a second new endpoint addition action set comprising:
  creating a second new endpoint migration job for the second new endpoint; and
  assigning a second new endpoint migration job priority to the second new endpoint migration job; and
  adding, based on the new endpoint migration job priority, the second new endpoint migration job to the queue.

10. The non-transitory computer readable medium of claim 9, wherein the method executed by the instructions further comprises:
after adding the second new endpoint migration job to the queue, restarting the second migration job.

11. The non-transitory computer readable medium of claim 10, wherein the method executed by the instructions further comprises:
after completing the second migration job, performing the second new endpoint migration job before any of the remaining migration jobs based on the new endpoint migration job priority.

12. The non-transitory computer readable medium of claim 7, wherein the first priority and a set of priorities for the remaining workflow jobs are based on a migration workflow history.

13. A system for new endpoint addition, the system comprising:
a host addition device, comprising circuitry, and configured to:
  receive, during execution of a migration workflow, a request to add a new endpoint to the migration workflow, wherein the execution of the migration workflow comprises performing a first migration job associated with a first consistency group and assigned a first priority;
  make a first determination that the first priority is higher than a priority threshold;
  based on the first determination, complete the first migration job;
  perform, after completing the first migration job, a new endpoint addition action set comprising:
    creating a new endpoint migration job for the new endpoint; and
    assigning a new endpoint migration job priority to the new endpoint migration job; and
  add, based on the new endpoint migration job priority, a remaining migration job associated with the new endpoint migration job to a queue of the migration workflow,
  wherein after adding the new endpoint migration job to the queue, receive, during the execution of the migration workflow, a second request to add a second new endpoint to the queue of the migration workflow,
  wherein the execution of the migration workflow further comprises performing a second migration job associated with a second consistency group and assigned a second priority.

14. The system of claim 13, wherein the host addition device is further configured to:
   assign the first priority to the first migration job that is higher than the priority threshold; and
   assign the second priority to the second migration job of the migration workflow that is lower than the priority threshold.

15. The system of claim 14, wherein the host addition device is further configured to:
   make a second determination that the second priority is lower than the priority threshold;
   based on the second determination, pause the second migration job;
   perform, after pausing the second migration job, a second new endpoint addition action set comprising:
      create a second new endpoint migration job for the second new endpoint; and
      assign a second new endpoint migration job priority to the second new endpoint migration job;
      add, based on the new endpoint migration job priority, the second new endpoint migration job to the queue; and
      after adding the second new endpoint migration job to the queue, restart the second migration job.

16. The system of claim 15, wherein the host addition device is further configured to:
   after completing the second migration job, perform the second new endpoint migration job before any of the remaining migration jobs based on the new endpoint migration job priority.

17. The system of claim 13, wherein the first priority and a set of priorities for the remaining workflow jobs are based on a migration workflow history.

* * * * *